UNITED STATES PATENT OFFICE.

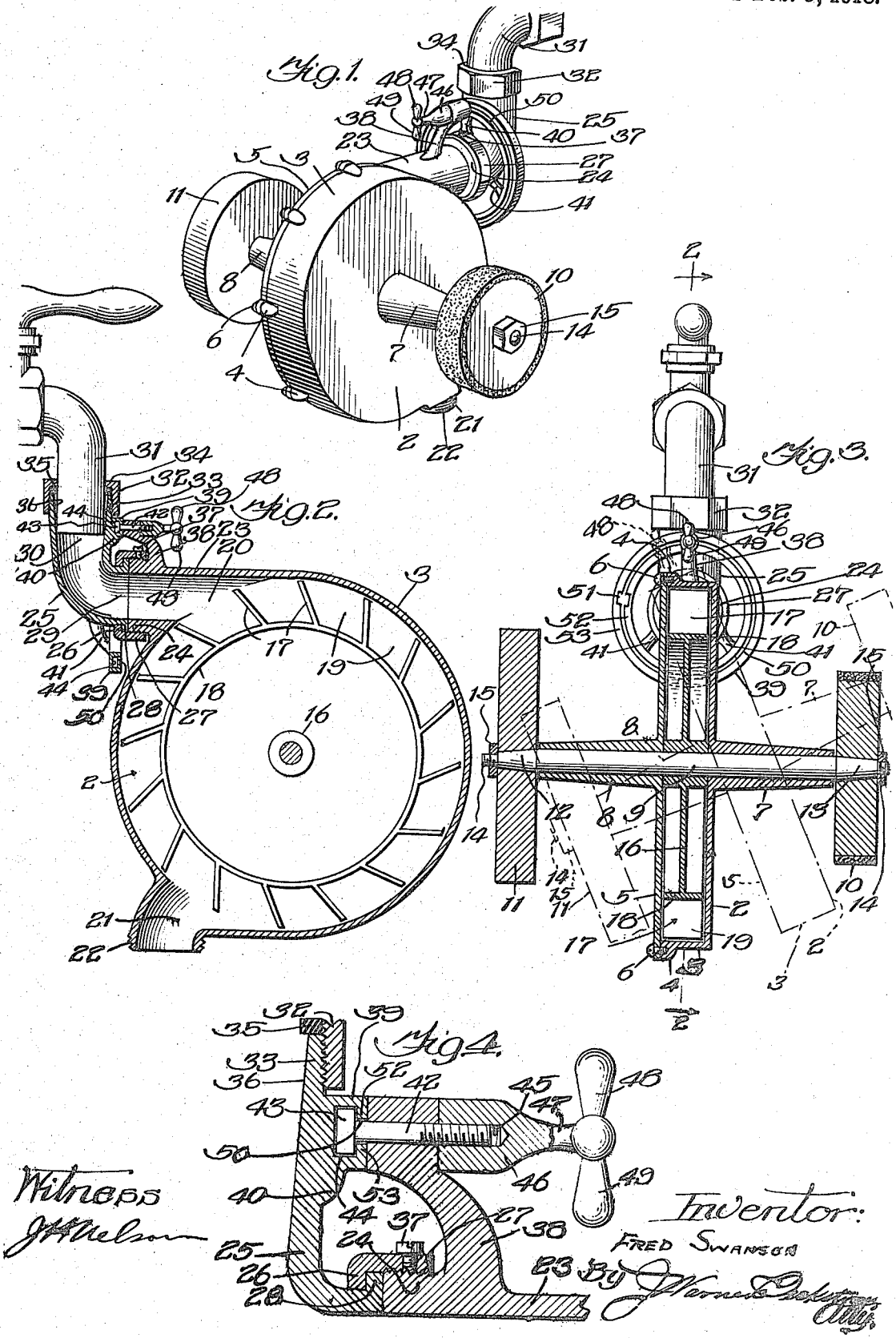

FRED SWANSON, OF CHICAGO, ILLINOIS.

MOTOR.

1,255,663.  Specification of Letters Patent.  Patented Feb. 5, 1918.

Application filed March 1, 1916. Serial No. 81,393.

*To all whom it may concern:*

Be it known that I, FRED SWANSON, a citizen of the United States, residing at Chicago, in the county of Cook and State of Illinois, have invented certain new and useful Improvements in Motors, of which the following is a specification.

My invention relates to water motors and has particular reference to a household convenience in the form of a small faucet motor and a small grinding machine adapted particularly for the home and previously established conditions as to plumbing arrangements and the positions of water faucets relative to wash basins, sinks and the like. The objects of the invention is to provide a water motor adapted for the small grinding operations which are called for frequently in a home; to provide a motor and grinder with a large range of adjustment so that it may be made to accommodate itself to the restricted space, for instance, between a faucet and wash basin, that may be adjusted to rotate in different planes at either side of a faucet and which may be reversed in its direction of rotation by such adjustment to rotate a driven part or mechanism in any required direction or angle.

With these general objects in view my invention consists in the novel construction, combination and arrangement of parts, all as hereinafter described in detail, illustrated in the accompanying drawing, and more particularly pointed out in the appended claims.

In the drawing—

Figure 1 is a perspective view of a machine embodying my invention.

Fig. 2 is a vertical section through the motor in a plane at right angles to the axis of the shaft.

Fig. 3 is a vertical section in the plane of the axis of the shaft.

Fig. 4 is an enlarged view of a part of Fig. 2.

In the several views 2 represents one side of the motor casing on which is an annular flange 3 with screw-threaded apertured lugs 4 to which the opposite side —5— of the casing is secured by means of screws. On the two sides 2 and 5 are hubs 7 and 8 which support the motor shaft —9— carrying a grinding wheel 10 on one end and a polishing wheel, or other wheel, 11 on the other end. The shaft has tapered ends 12 and 13 with threaded nipples 14 on which are nuts 15 which hold the respective wheels on the shaft, but these details may be varied in numerous ways. Within the casing is a water wheel 16 with usual blades or wings 17 extending from a rim 18 which should fit snugly but not tightly against the sides 2 and 5. This leaves a usual annular water passage or space 19 for which an inlet 20 and an outlet 21 is provided in the peripheral outer rim or flange 3. The outlet is provided with a hub 22 to which a hose may be attached to properly conduct the exhaust flow when the motor is turned on its faucet connection hereinafter to be explained. A hub 23 on the casing leads to the inlet 20 and this hub has a threaded end 24 which is connected with an elbow pipe joint 25 by means of a flange 26 on a collar 27 that has threaded engagement with the threaded portion 24 of the hub 23, by said flange 26 engaging a flange 28 on one end of the elbow 25. Through the elbow 25 is a passage the lower end of which is reduced as at 29 while the upper end flares upwardly as at 30 so that it may be adapted to receive more than one cross-sectional size of faucet bib 31. The latter is secured to the elbow 25 by means of a threaded collar 32 which has threaded engagement with exterior threads 33 on the upper end of the elbow 25. On the collar 32 is a flange 34 which bears against a fiber packing ring 35 which by turning the threaded collar, or nut, 32 is wedged into a tapered annular space 36 between the faucet bib and the downwardly convergent walls of the opening 30. Threaded into a screw hole in the collar or nut 27 is a pointed set screw 37 which will prevent the collar from rotating on its threads, but the collar and its flange are rotatable on the flange 28 to permit adjustably turning the motor on the axis of the hub 23. The motor is held against accidental turning on said axis by means of an arm 38, which may be cast integral with the hub 23, and a ring 39, which may be cast integral with the elbow 25 through connecting webs or spokes 40 and 41, said arm 38 and ring 39 being held against relative movement by a bolt 42 with a head 43 in a slot 44 of the ring. The threaded end of the bolt 42 projects through a hole therefor in the upper end of the arm 38, and said threaded end is engaged by a threaded socket bore 45 in a head, end, or nut 46 having a stem 47 with wings 48 and 49 by means of which the nut 46 may be turned by hand. By turning the nut 46 onto the threads of the bolt 42, the arm 38 and ring 39 are clamped together. When the nut is loosened the motor may be rotated into any desired position to the extent of entirely reversing its position so as to place the outlet 21 at the top and the inlet 20 at the bottom of the motor, the head 43 of the bolt sliding along the slot 44. A narrower slot 50 leads from the outer surface of the ring to the slot or channel 44, the narrower slot being engaged by the body of the bolt. At a suitable point on the circle of the slot 50 the latter is widened into an opening 51 through which the bolt head may be inserted into the slot 44 and engaged with the annular flanges —52 and 53— produced by the difference in width between the slots 44 and 50.

Although provision has been made for a wide range of adjustability and adaptation to varying conditions and situations, the construction and arrangement contemplates a low cost of manufacture, or molding or die work, and an arrangement of parts which will permit numerous modifications in the minor details of construction.

Having thus described my invention, I claim as new and desire to secure by Letters Patent—

1. The combination with a faucet, of a water motor and an angularly adjustable connection between said faucet and motor, said connection being constructed and arranged to permit tilting of the motor in a vertical plane passing through the axis of the wheel.

2. The combination with a faucet, of a water motor, an elbow-joint pipe which serves to connect said faucet and motor, said elbow-joint pipe having an upwardly flared or gradually enlarged inlet to receive the nozzle or bib of the faucet, and a contracted, or reduced outlet, means for securing said elbow-joint pipe by frictional engagement to said faucet, means swiveling said elbow-joint pipe to the motor body, and means for fastening the motor against accidental rotation of its body or casing at any point on a complete circle of swivel adjustment.

In testimony whereof I have hereunto signed my name.

FRED SWANSON.